(12) United States Patent
Saleh et al.

(10) Patent No.: US 7,202,479 B2
(45) Date of Patent: Apr. 10, 2007

(54) METHOD FOR ASSIGNING A PULSE RESPONSE TO ONE OF A PLURALITY OF PULSE TYPES WITH DIFFERENT DECAY TIMES AND DEVICE FOR CARRYING OUT SAID METHOD

(75) Inventors: Hassan Saleh, Abu El Numrus (EG); Egon Zimmerman, Inden (DE); Horst Halling, Inden-Pier (DE)

(73) Assignee: Forschungszentrum Julich GmbH, Julich (DE)

( * ) Notice: Subject to any disclaimer, the term of this patent is extended or adjusted under 35 U.S.C. 154(b) by 84 days.

(21) Appl. No.: 10/502,024

(22) PCT Filed: Dec. 23, 2002

(86) PCT No.: PCT/EP02/14710

§ 371 (c)(1),
(2), (4) Date: Feb. 17, 2005

(87) PCT Pub. No.: WO03/060557

PCT Pub. Date: Jul. 24, 2003

(65) Prior Publication Data

US 2005/0269515 A1 Dec. 8, 2005

(30) Foreign Application Priority Data

Jan. 21, 2002 (DE) ................ 102 01 995

(51) Int. Cl.
*G01T 1/20* (2006.01)
(52) U.S. Cl. ........................ 250/369; 250/367
(58) Field of Classification Search ............... 250/369, 250/367
See application file for complete search history.

(56) References Cited

U.S. PATENT DOCUMENTS

| 4,870,667 | A | | 9/1989 | Brunnett et al. |
| 5,347,129 | A | | 9/1994 | Miller et al. |
| 5,744,803 | A | * | 4/1998 | Grodsinsky et al. ........ 250/369 |
| 5,866,907 | A | | 2/1999 | Drukier et al. |
| 6,194,728 | B1 | | 2/2001 | Bosnjakovic |

FOREIGN PATENT DOCUMENTS

| DE | 198 35 671 A1 | | 2/1999 |
| JP | 02195235 A | * | 8/1990 |

OTHER PUBLICATIONS

IEEE Transactions on Nuclear Science, vol. XP0-000873887, "Advantages Using Pulse Shape Discrimination . . . ", 1999.

* cited by examiner

*Primary Examiner*—Constantine Hannaher
(74) *Attorney, Agent, or Firm*—Berenato, White & Stavish, LLC

(57) ABSTRACT

A method for assigning a pulse profile, in particular a pulse profile of a scintillation detector having at least two scintillation materials with different decay characteristics, to one of a plurality of pulse types with differing decay times, encompasses the method steps of: acquiring an output pulse profile and converting the pulse profile into an electrical signal whose amplitude-time profile represents the pulse profile of the output pulse; transforming the amplitude-time profile into the frequency space in order to obtain an amplitude-frequency profile representing the output pulse; normalizing the amplitude-frequency profile in order to obtain a normalized amplitude-frequency profile; comparing the normalized amplitude-frequency profile with a predetermined reference profile; and assigning the output pulse profile to one of the pulse types on the basis of the result of the comparison.

16 Claims, 5 Drawing Sheets

METHOD FOR ASSIGNING A PULSE RESPONSE TO ONE OF A PLURALITY OF PULSE TYPES WITH DIFFERENT DECAY TIMES AND DEVICE FOR CARRYING OUT SAID METHOD

The invention concerns a method for assigning a pulse profile, in particular a pulse profile of a scintillation detector having at least two scintillation materials with different decay characteristics, to one of a plurality of pulse types with differing decay times. The invention further concerns an apparatus for carrying out the method.

In nuclear medicine, radioactively labeled substances are used for in vivo measurement of physiological processes. One sensitive nuclear-medicine method is positron emission tomography (PET). This uses isotopes that disintegrate with emission of a positron. A particular attraction of this method is the fact that some of the elements of greatest physiological interest, such as carbon, nitrogen, or oxygen, have short-lived radioactive isotopes that emit a positron as they disintegrate. The emitted positron undergoes annihilation with an electron in the tissue within a distance of 1–2 mm and generates two gamma quanta, emitted in opposite directions, with an energy of 511 keV. Simultaneous detection of the gamma quanta in oppositely located detectors, which are usually arranged in a detector ring, constitutes the basis for tomographic image reconstruction.

Each detector of the ring contains a scintillation crystal that, upon impact of a gamma quantum, emits a flash of light having a decay time that is characteristic of the scintillation material. Bismuth germanate (BSO), for example, which is often used, has a decay time of 300 ns, which together with its relative low light yield limits the positional resolution that can be achieved. Newer scintillation materials with great potential for PET applications include lutetium oxy-orthosilicate (LSO) with eight times the light yield of BSO and a decay time of 40 ns, and LuAP ($LuAlO_3$), with a decay time of 17 ns. The light pulses of the scintillator crystals are sensed by a photodetector, typically a photomultiplier or photodiode, that emits electrical signals suitable for further processing.

In order to increase positional resolution, modern detectors contain two or more different scintillation crystals that have different decay times and are coupled to the same photodetector. By analyzing the output signals of the photodetectors it is possible to identify, on the basis of the different decay times, which detector crystal responded, and thus to ascertain the depth of interaction (DOI) in the detector.

An integrating amplifier is usually used, as the photodetector signals are read out, to perform this assignment of the photodetector output signals to one of the scintillation crystals. A comparison of rise times (defined as the time from 10% to 90% of the maximum value) then allows the different detector pulses to be distinguished.

In another approach, a start value (beginning of the pulse) and a stop value (end of the pulse) are generated for each detector signal. A time-to-amplitude converter then supplies an output signal having an amplitude that is proportional to the time between the start and stop values and can be used to discriminate the detector pulses.

All of the aforesaid differentiation and assignment methods exhibit low reliability with noisy signals, and require a high sampling rate for the signal pulses that are to be assigned.

It is therefore the object of the invention to describe a method of the kind cited initially that makes possible a reliable and efficient (in terms of sampling rate) assignment of a pulse sequence to one of a plurality of pulse types with differing decay times.

This object is achieved, according to the present invention, by way of a method for assigning a pulse profile, in particular a pulse profile of a scintillation detector having at least two scintillation materials with different decay characteristics, to one of a plurality of pulse types with differing decay times, that encompasses the method steps of:

acquiring an output pulse profile and converting the pulse profile into an electrical signal whose amplitude-time profile represents the pulse profile of the output pulse;

transforming the amplitude-time profile into the frequency space in order to obtain an amplitude-frequency profile representing the output pulse;

normalizing the amplitude-frequency profile in order to obtain a normalized amplitude-frequency profile;

comparing the normalized amplitude-frequency profile with a predetermined reference profile; and assigning the output pulse profile to one of the pulse types on the basis of the result of the comparison.

The invention is thus based on the idea of performing the assignment to one of the pulse types not in the time space, but in the frequency space. For that purpose, the measured pulse profiles are normalized after being transformed, and compared with a reference profile that at the same time represents a boundary profile between two different pulse types. Based on the result of that comparison, the measured pulse profile can then be assigned to one of the pulse types. A differentiation between two pulse types generally requires one comparison. If an assignment to one of more than two pulse types is performed, several comparisons with more than one reference profile may also be necessary.

The comparison in the frequency space can be performed more reliably and substantially more effectively (lower sampling rate) than in the time space. At the same time, efficient algorithms are available for transforming the time profile of the measured pulse into the frequency space.

In a preferred embodiment of the method, the electrical signal is subjected, prior to the transformation into the frequency space, to an analog/digital conversion with a predetermined sampling rate, in order to obtain a discrete amplitude-time profile representing the output pulse.

In the method according to the present invention, in the transforming step the discrete amplitude-time profile is advantageously subjected to a discrete Fourier transform (DFT) in order to obtain a discrete amplitude-frequency profile. The discrete Fourier transform can be calculated, in particular, using a fast Fourier transform.

In the normalizing step, the amplitude-frequency profile is advantageously referred to the amplitude at a frequency of zero; in particular, it is useful to divide the amplitude-frequency profile by the amplitude at a frequency of zero.

In a preferred refinement of the method according to the present invention, in the comparison step the difference profile between the normalized amplitude-frequency profile and the reference profile is determined, the difference profile for each frequency is multiplied by a predetermined weighting factor, and the sum of those products over all frequencies is calculated as the assignment parameter.

The assignment to one of the pulse types can be performed on the basis of the sign and/or the absolute value of the assignment parameter. In particular, in the case where the output pulse profile is assigned to one of two pulse types with differing decay times, the assignment can be performed only on the basis of the sign of the assignment parameter.

This allows a particularly simple decision as to the assignment of a measured pulse to one of the pulse types.

In an embodiment of the method, the weighting factor is selected in such a way that it has a maximum at small frequencies and decreases toward large frequencies. This accounts for the observation that the lower frequencies contribute more greatly than higher frequencies to the discrimination of pulse types.

In the context explained above, it is preferred if the high-frequency components of the electrical signal are suppressed by a lowpass filter before transformation into the frequency space. Disruptive aliasing of signals whose frequency is higher than half the sampling rate can thereby be prevented during digitization (A/DC) of the signal.

The method can be developed in particularly advantageous fashion by the fact that prior to the acquisition of pulse profiles that are to be assigned, a reference profile is determined by acquiring calibration pulse profiles having a known assignment to two pulse types with differing decay times, and converting the respective pulse profiles into an electrical signal whose amplitude-time profile represents the pulse profile of the calibration pulse;

transforming the respective amplitude-time profile into the frequency space in order to obtain an amplitude-frequency profile representing the calibration pulse;

normalizing the amplitude-frequency profile in order to obtain a normalized amplitude-frequency profile; and defining a reference value for each frequency in such a way that the amplitude values of the calibration pulses of the first pulse type for that frequency are substantially greater than the reference value, and the amplitude values of the calibration pulses of the second pulse type for that frequency are substantially less than the reference value.

In particular, the reference value for each frequency can advantageously be defined by the fact that an amplitude histogram is prepared for each of the various pulse types, the intersection point of the envelopes of the histograms is identified, and the identified intersection point is defined as the reference value.

It is viewed as particularly advantageous in the context explained above if, prior to the acquisition of pulse profiles to be assigned, the weighting factor is determined for each frequency by determining the average magnitude of the deviation of the amplitude values from the reference value for that frequency, for each of the pulse types; and defining a high weighting for that frequency for a large average deviation magnitude, and a low weighting for that frequency for a low average deviation magnitude.

An apparatus according to the present invention for carrying out the method described encompasses a means for acquiring an output pulse profile and a means for converting the pulse profile into an electrical signal whose amplitude-time profile represents the pulse profile of the output pulse;

a means for transforming the amplitude-time profile into the frequency space in order to obtain an amplitude-frequency profile representing the output pulse;

a means for normalizing the amplitude-frequency profile in order to obtain a normalized amplitude-frequency profile;

a means for comparing the normalized amplitude-frequency profile with a predetermined reference profile;

a means for assigning the output pulse profile to one of the pulse types on the basis of the result of the comparison, and for outputting the assignment result;

a means for determining the reference profile;

a means for determining the weighting factors.

The respective means can, in principle, be constituted by a hardware component, such as a user-programmable logic circuit (FPGA), by software in a suitably equipped computer, or by firmware. The means can likewise be implemented in a digital signal processor (DSP).

Further advantageous embodiments, features, and details of the invention are evident from the dependent claims, the description of the exemplary embodiment, and the drawings.

The invention will be explained in more detail below with reference to an exemplary embodiment in conjunction with the drawings. Only the elements essential for comprehension of the invention are depicted in each case. In the drawings.

Figure 1:
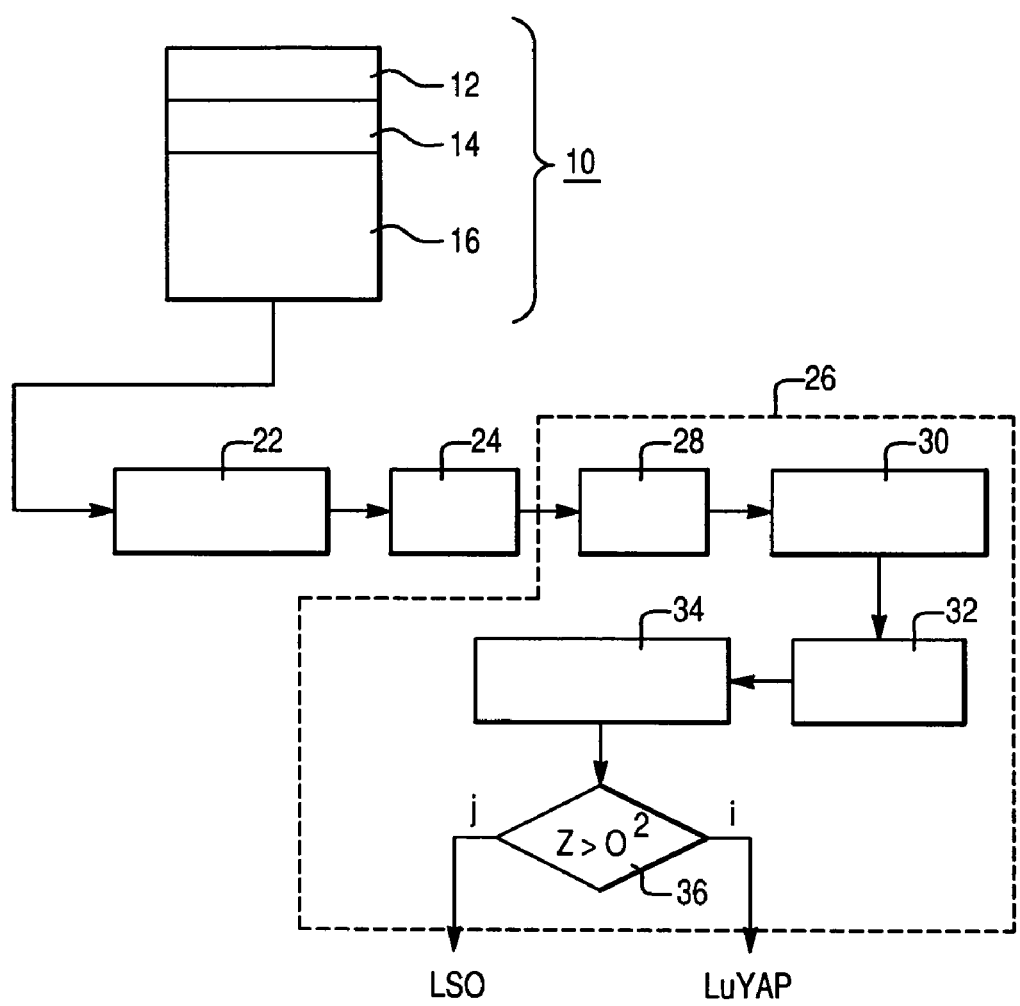
FIG. 1 is a block diagram of an apparatus for assigning a measured pulse profile, according to an exemplary embodiment of the invention.

An example of an application of the method according to the present invention to the assignment of a pulse profile to two pulse types is described below in detail with reference to FIGS. 1 through 8.

The scintillation detector 10 that is used contains two different scintillation crystal layers 12 and 14, arranged one behind another in front of a photodetector 16. In the exemplary embodiment, scintillation crystal 12 is made of LSO (lutetium oxyorthosilicate), with a decay time of 40 ns, and scintillation crystal 14 is made of LuYAP ($Lu_{1-x}Y_xAlO_3$), with a decay time of 17 ns.

To determine the reference profile and the weighting factors, firstly calibration pulses having a known assignment to the fast LuYAP crystal or the slower LSO crystal were acquired. The electrical pulse profiles of the calibration pulses supplied by photodetector 16 were lowpass-filtered using a second-order Butterworth filter 22 and a limit frequency of 10 MHz. The pulses were then digitized by A–D converter 24 at a sampling rate $f_s$ of 40 MHz, corresponding to twice the limit frequency of the lowpass filter.

Figure 2:
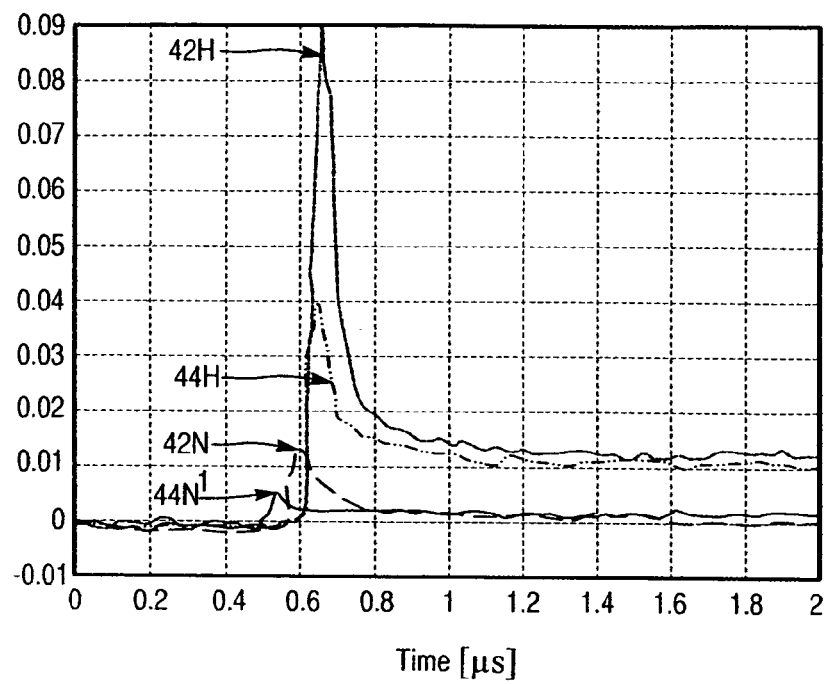
FIG. 2 is a plot of amplitude-time profiles for two signal pulses of each of two different scintillation crystals.

The result after lowpass filtering and digitization is shown in FIG. 2 for two pulses each of LSO crystal 12 (reference characters 42H, 42N) and of LuYAP crystal 14 (reference characters 44H, 44N). To better illustrate the method, one pulse with high energy (LSO: 42H; LUYAP: 44H) and one pulse with low energy (LSO: 42N; LUYAP: 44N) is selected and depicted in each case.

The amplitude-time profiles are then inputted into assignment apparatus 26, which encompasses user-programmable logic circuits 28, 30, 32, 34, and 36 whose function is evident from the description below.

The amplitude-time profiles of the calibration pulses are firstly Fourier transformed by means of a 32-point FFT (reference character 28), thereby achieving a resolution [Delta]f of 40 MHz/32=1.25 MHz at the aforesaid sampling rate.

Because the pulse shapes of the two detectors differ principally in the lower-frequency region below 10 MHz, good assignment results at the same resolution [Delta]f=1.25 MHz would be achieved even with a lower sampling rate of $f_s$=20 MHz, a lowpass filter with a limit frequency of 10 MHz, and a 16-point FFT. As described below in detail, the residue, i.e., the remaining frequency region above 10 MHz using the higher sampling rate resulted in a more reliable (97%) assignment of the pulses, but required greater calculation outlay because of the larger number of FFT points.

Figure 3:
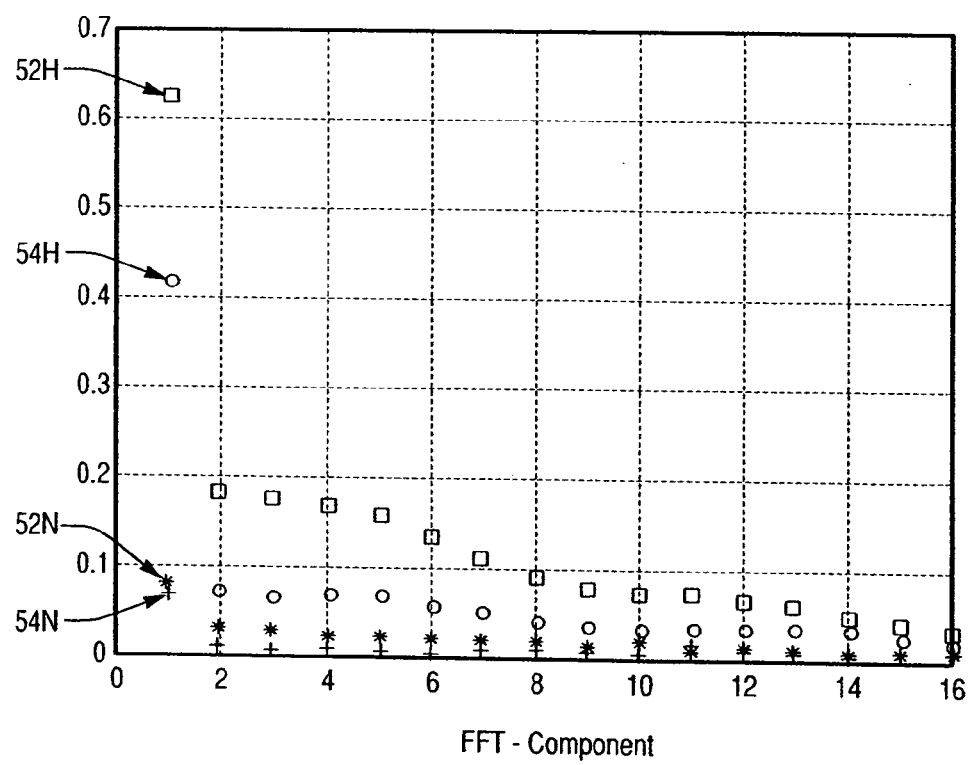
FIG. 3 is a plot of the amplitude-frequency profiles of the signal pulses of FIG. 2.

The result of the 32-point FFT for the four pulse profiles of FIG. 2 is depicted in FIG. 3. The i-th FFT component on the horizontal axis corresponds to $f_i$=(i−1)*1.25 MHz, and the vertical axis indicates the amplitude $A(f_i)$ of the pulse profiles at frequency $f_i$. Because of the symmetry of the 32 FFT components, only the first 16 FFT components are shown in FIG. 3. The amplitude-frequency profiles of the four calibration pulses are depicted by squares 52H (LSO, high energy), circles 54H (LuYAP, high energy), asterisks 52N (LSO, low energy), and crosses 54N (LuYAP, low energy). The difference in total energy is clearly evident from the different DC amplitudes for the i=1 component.

For normalization, the amplitude-frequency profile of each pulse is divided by its first frequency component $A(f_1)$ (reference character 30). The resulting normalized amplitude-frequency profiles $A_N(f_i)$ are then no longer dependent on the energy of the pulses.

Figure 4:
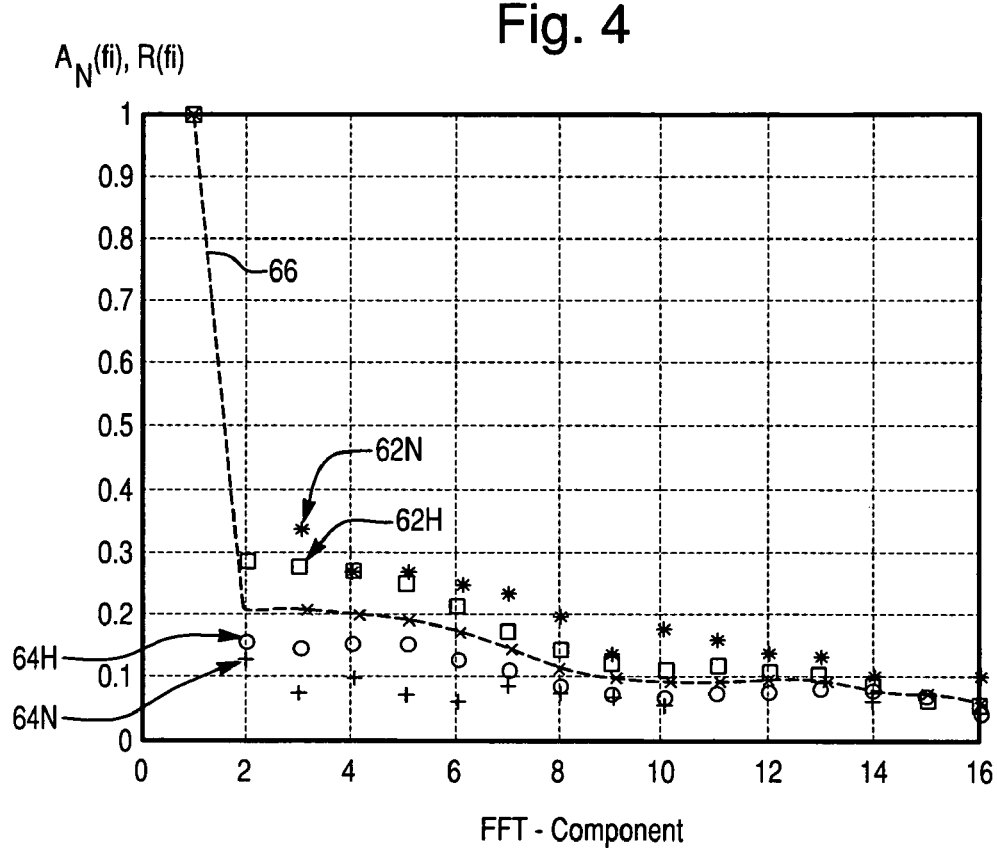
FIG. 4 is a plot of the normalized amplitude-frequency profiles of the signal pulses in FIG. 2, and of a reference profile.

FIG. 4 shows the normalized profiles, using reference characters 62H and 62N for LSO and reference characters 64H and 64N for LuYAP. As is clearly evident from FIG. 4, the signals of the different detectors are separated from one another in the frequency space by a gap that is particularly distinct for the lower-frequency components $f_2$ through $f_8$. A reference profile 66 that extends in the middle of the gap between the two pulse types is likewise depicted in FIG. 4. As the Figure also shows, more than one frequency component can be used to differentiate the two pulse types.

Reference profile 66 was obtained, for each frequency $f_i$, by plotting the amplitude values for a series of calibration pulses of each pulse type in an amplitude histogram. The intersection point of the envelopes of the respective amplitude histograms yields the value of the reference profile $R(f_i)$ for that frequency $f_i$.

Figure 5:
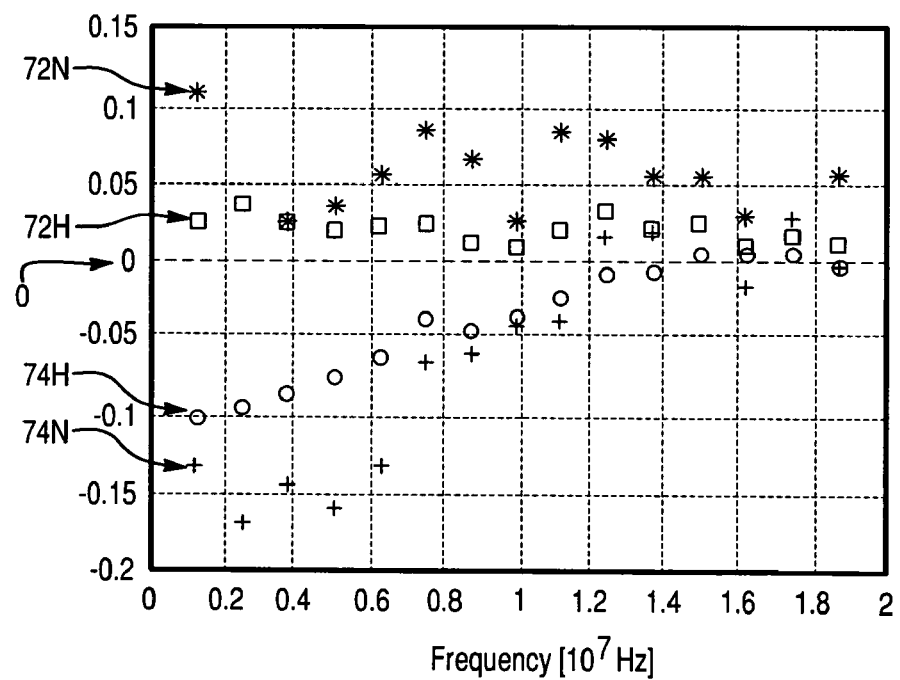
FIG. 5 is a plot of the difference between the normalized amplitude-frequency profiles and the reference profile of FIG. 4.
Figure 6:
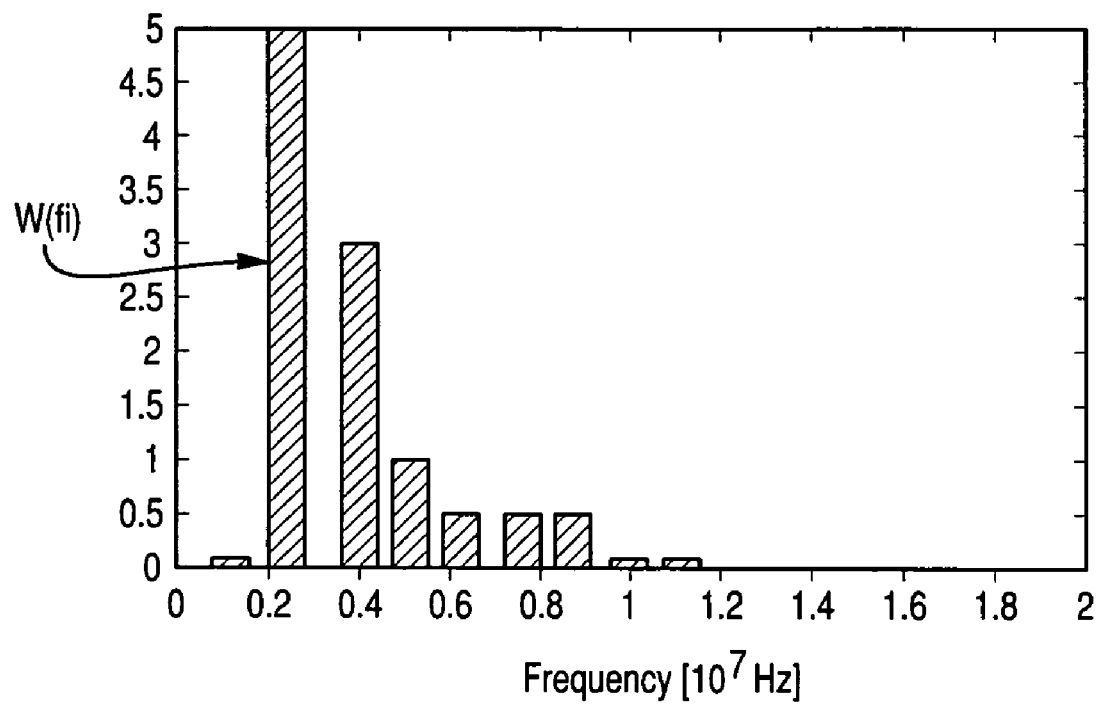
FIG. 6 is a diagram indicating the weighting factors for the frequency components of FIG. 5.

The difference between the normalized amplitude-frequency profiles $A_N(f_i)$ and the reference profile $R(f_i)$ was then calculated (reference character 32). The result is shown in FIG. 5 as 72H and 72N for the LSO pulses, and 74H and 74N for the LuYAP pulses. The difference values are for the most part positive for the LSO pulses, substantially negative for the LuYAP pulses. As is apparent from FIG. 5, the different pulses can easily be separated at the lower frequency components, but differentiation becomes impossible for higher frequency components.

To account for this situation, for each frequency component a weighting factor $W(f_i)$ was defined, representing an indication of the suitability of that frequency component for pulse type discrimination. The average magnitude of the deviation of the amplitude values from the reference value for each of the pulse types was taken in each case as the indication of differentiation suitability. From the amplitudes depicted in FIG. 5, the weighting factors $W(f_i)$ shown by way of example in FIG. 6 can be calculated for each frequency component $f_i$. As is also graphically clear from FIG. 5, the components with a low index, in particular the frequency components at 2.5 MHz and 3.75 MHz, receive a high weight in this context, while the weighting factors for the higher frequencies, which do not contribute to discrimination, are set to zero.

The reference profile $R(f_i)$ and weighting factors $W(f_i)$ thus determined are stored, and can then be used, as presented below, for the assignment of measured pulse profiles whose origin from one of the two detectors is not known.

For illustration, assignment on the basis of the previously used calibration pulses from the LSO and LuYAP crystals will be explained. When a new pulse of unknown 5 assignment is measured, the steps described above (with the exception of calculation of the reference profile and weighting factors) are therefore performed.

Figure 7:
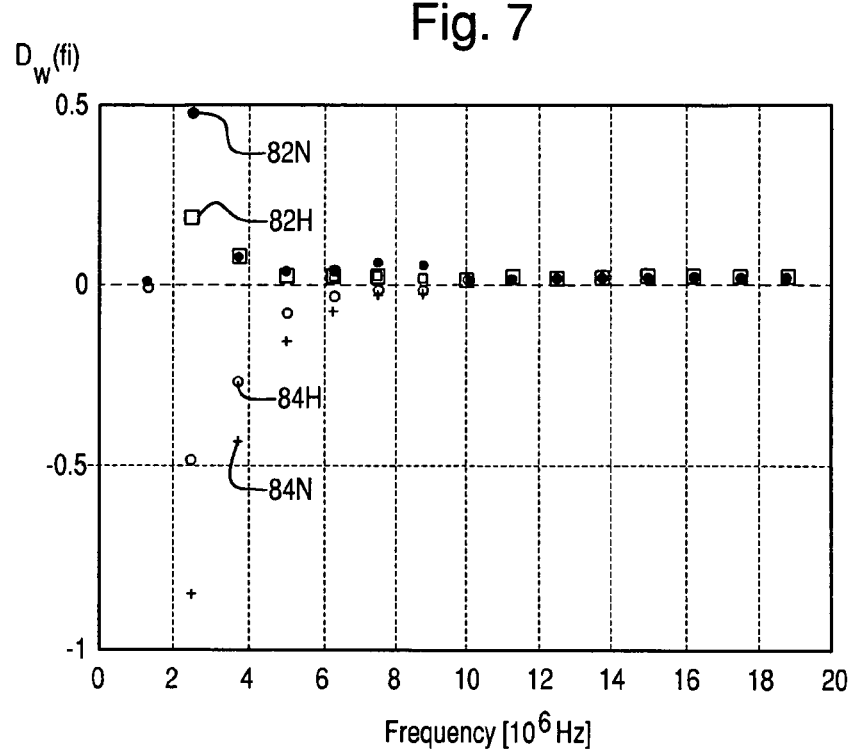
FIG. 7 is a plot of the weighted difference profiles of FIG. 5.

The difference between the normalized amplitude-frequency profile $A_N(f_i)$ and the reference profile $R(f_i)$ for each frequency is then multiplied by the weighting factor:

$$D_W(f_i) = W(f_i) * (A_N(f_i) - R(f_i))$$

to obtain a weighted difference $D_W(f_i)$ (reference character 34). The value profiles, weighted in this fashion, are depicted in FIG. 7 as 82H and 82N for the LSO pulses, and 84H and 84N for the LuYAP pulses.

Summing over the contributions of all frequencies then yields the assignment parameter Z for each pulse (reference character 34). The sign of Z is sufficient for assignment. A positive value of Z results in assignment of the measured pulse as a signal from the LSO crystal, a negative value to assignment as a signal from the LuYAP crystal (reference character 36).

Figure 8:
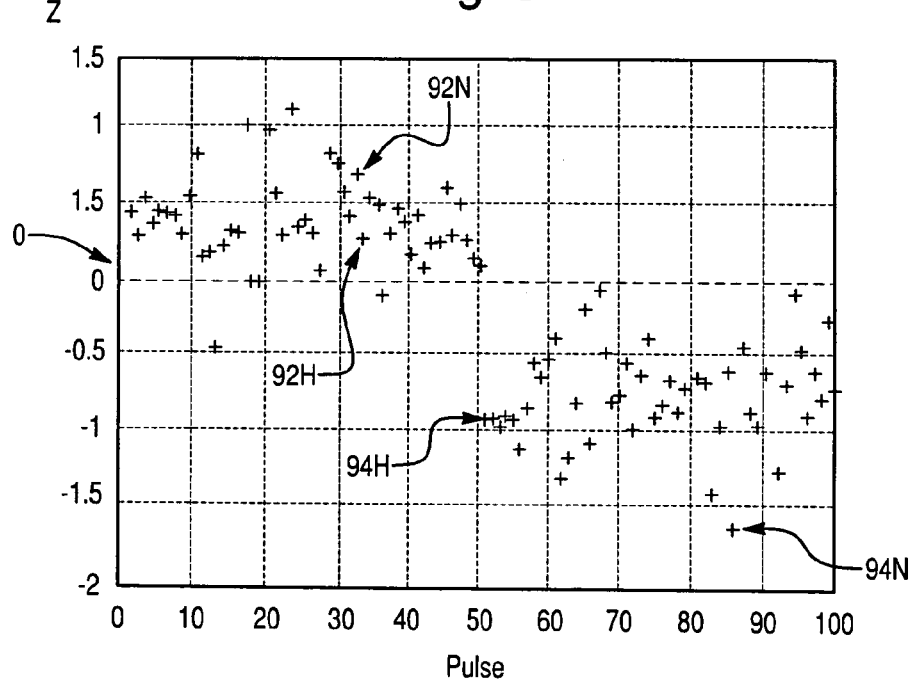
FIG. 8 is a plot of the assignment parameter for a hundred output pulses from two different scintillation crystals, determined in accordance with the method according to the present invention.

In order to investigate the reliability of the method according to the present invention, once the reference profile $R(f_i)$ and weighting factors $W(f_i)$ had been defined, one hundred output pulses—fifty from the LSO crystal and fifty from the LuYAP crystal—were assigned in accordance with the method explained above. FIG. 8 shows the respective assignment parameters Z for the LSO pulses (reference character 92) and LuYAP pulses (reference character 94). The Z values for the four calibration pulses are likewise plotted as 92H, 92N, 94H, and 94N. As is apparent from the Figure, the method according to the present invention results in correct assignment of 97% of the pulses.

The invention claimed is:

1. A method for assigning a pulse profile, in particular a pulse profile of a scintillation detector having at least two scintillation materials with different decay characteristics, to one of a plurality of pulse types with differing decay times, comprising the method steps of acquiring an output pulse profile and converting the pulse profile into an electrical signal whose amplitude-time profile represents the pulse profile of the output pulse;

transforming the amplitude-time profile into the frequency space in order to obtain an amplitude-frequency profile representing the output pulse;

normalizing the amplitude-frequency profile in order to obtain a normalized amplitude-frequency profile;

comparing the normalized amplitude-frequency profile with a predetermined reference profile; and assigning the output pulse profile to one of the pulse types on the basis of the result of the comparison.

2. The method as defined in claim 1, wherein the electrical signal is subjected, prior to the transformation into the frequency space, to an analog/digital conversion with a predetermined sampling rate, in order to obtain a discrete amplitude-time profile representing the output pulse.

3. The method as defined in claim 2, wherein in the transforming step, the discrete amplitude-time profile is subjected to a discrete Fourier transform (DFT) in order to obtain a discrete amplitude-frequency profile.

4. The method as defined in claim 3, wherein the discrete Fourier transform is calculated using a fast Fourier transform (FFT).

5. The method as defined in claim 1, wherein in the normalizing step, the amplitude-frequency profile is referred to the amplitude at a frequency of zero; in particular, the amplitude-frequency profile is divided by the amplitude at a frequency of zero.

6. The method as defined in claim 1, wherein in the comparison step, the difference profile between the normalized amplitude-frequency profile and the reference profile is determined, the difference profile for each frequency is multiplied by a predetermined weighting factor, and the sum of those products over all frequencies is calculated as the assignment parameter.

7. The method as defined in claim 6, wherein the assignment to one of the pulse types is performed on the basis of the sign and/or the absolute value of the assignment parameter.

8. The method as defined in claim 6, wherein the output pulse profile is assigned to one of two pulse types with differing decay times, and the assignment is performed only on the basis of the sign of the assignment parameter.

9. The method as defined in claim 6, wherein the weighting factor has a maximum at small frequencies and decreases toward large frequencies.

10. The method as defined in claim 1, wherein high-frequency components of the electrical signal are suppressed by a lowpass filter before transformation into the frequency space.

11. The method as defined in claim 1, wherein prior to the acquisition of pulse profiles that are to be assigned, a reference profile is determined by
    acquiring calibration pulse profiles having a known assignment to two pulse types with differing decay times, and converting the respective pulse profiles into an electrical signal whose amplitude-time profile represents the pulse profile of the calibration pulse;
    transforming the respective amplitude-time profile into the frequency space in order to obtain an amplitude-frequency profile representing the calibration pulse;
    normalizing the amplitude-frequency profile in order to obtain a normalized amplitude-frequency profile; and
    defining a reference value for each frequency in such a way that the amplitude values of the calibration pulses of the first pulse type for that frequency are substantially greater than the reference value, and the amplitude values of the calibration pulses of the second pulse type for that frequency are substantially less than the reference value.

12. The method as defined in claim 11, wherein the reference value for each frequency is defined by the fact that an amplitude histogram is prepared for each of the various pulse types, the intersection point of the envelopes of the histograms is identified, and the identified intersection point is defined as the reference value.

13. The method as defined in claim 11, wherein prior to the acquisition of pulse profiles to be assigned, the weighting factor is determined for each frequency by
    determining the average magnitude of the deviation of the amplitude values from the reference value for that frequency, for each of the pulse types; and
    defining a high weighting for that frequency for a large average deviation magnitude, and a low weighting for that frequency for a low average deviation magnitude.

14. An apparatus for carrying out the method described as defined in claim 1, comprising
    a means for acquiring an output pulse profile and a means (10) for converting the pulse profile into an electrical signal whose amplitude-time profile represents the pulse profile of the output pulse;
    a means (28) for transforming the amplitude-time profile into the frequency space in order to obtain an amplitude-frequency profile representing the output pulse;
    a means (30) for normalizing the amplitude-frequency profile in order to obtain a normalized amplitude-frequency profile;
    a means (32, 34) for comparing the normalized amplitude-frequency profile with a predetermined reference profile; and
    a means (36) for assigning the output pulse profile to one of the pulse types on the basis of the result of the comparison, and for outputting the assignment result.

15. The apparatus as defined in claim 14, in which the means (32, 34) for comparing and the means (36) for assigning are constituted by a user-programmable logic circuit (FPGA) or a digital signal processor (DSP) or (PC).

16. The apparatus as defined in claim 15, in which the means (28) for transforming and the means (30) for normalizing are constituted by a user-programmable logic circuit (FPGA) or a digital signal processor (DSP) or (PC).

* * * * *